March 30, 1954
W. E. CUNNINGHAM
2,673,486
AUTOMATIC FILM LOOP RESTORER MECHANISM
Filed Aug. 24, 1951
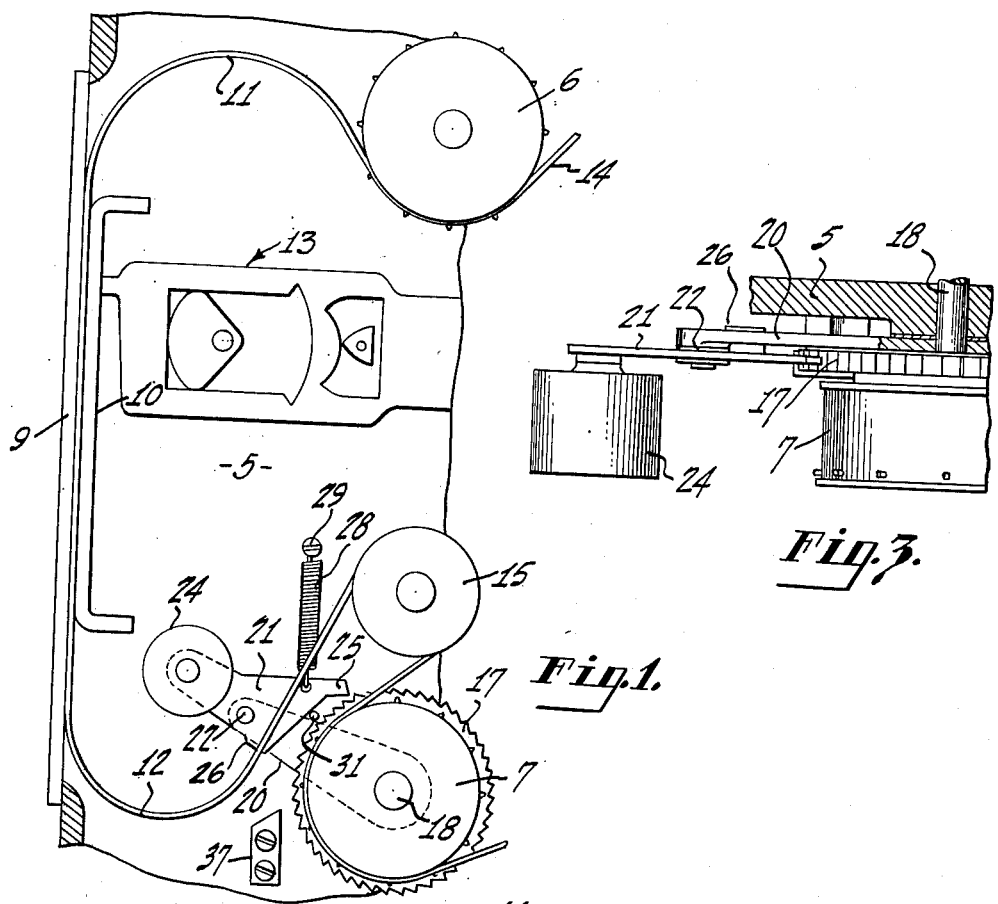
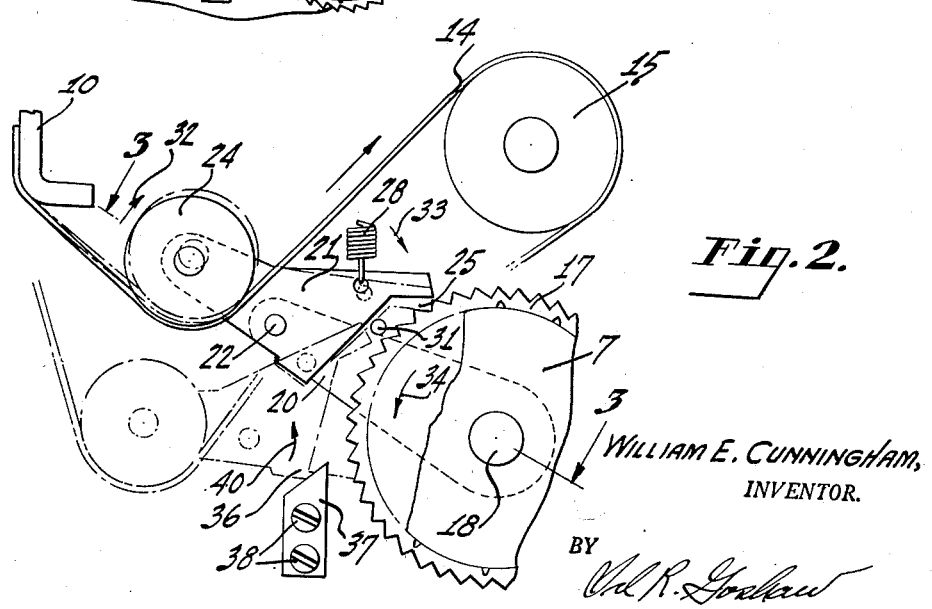
WILLIAM E. CUNNINGHAM,
INVENTOR.
BY
ATTORNEY Patented Mar. 30, 1954

2,673,486

UNITED STATES PATENT OFFICE 2,673,486

AUTOMATIC FILM LOOP RESTORER MECHANISM

William E. Cunningham, Visalia, Calif.

Application August 24, 1951, Serial No. 243,481

7 Claims. (Cl. 88—18)

This invention relates to motion picture film apparatus, and particularly to a loop restoring mechanism between a continuous film advancing sprocket and an intermittent film advancing mechanism.

It is well-known in certain motion picture apparatus, such as cameras and projectors, that the film is continuously driven at one or more points and intermittently driven at another point. It is realized that the film should not be taut between a continuous advancing mechanism and an intermittent advancing mechanism, but should be in the form of soft loops for the device to function properly. However, due to damaged film perforations and other factors, the film may become taut between the two different advancing mechanisms, particularly on the exit side of the intermittent mechanism. When this occurs, the film is continuously advanced through the intermittent mechanism which destroys the operation of the camera or projector.

The present invention will automatically restore the soft loop if it is lost by the film's not being advanced by the intermittent mechanism as fast as it is advanced by the continuous mechanism. It may be built in or be an attachment to the film device. The restorer, in brief, is an arm having a roller which normally is not in contact with the film, but which is positioned within the film loop. When the loop is shortened and the film moves the arm, it is brought into contact with a rotatable wheel which accelerates the advancement of the film through the intermittent mechanism until the loop is the proper size, at which time the arm is disconnected from the rotatable wheel and it moves back to its normal position.

The principal object of the invention, therefore, is to facilitate the continuous satisfactory operation of film advancing mechanisms.

Another object of the invention is to provide an improved film loop restorer when the film loop varies in size.

A further object of the invention is to provide an improved mechanism for automatically increasing the size of a film loop when it is decreased to a predetermined size.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is an elevational view of a film advancing mechanism embodying the invention.

Fig. 2 is an enlarged detail view showing several positions of the invention during operation, and Fig. 3 is a view, partly in cross-section, taken along the line 3—3 of Fig. 2.

Referring now to the drawings, in which the same numerals identify like elements, a mounting plate 5 of either a camera or projector has an upper continuously rotatable sprocket 6 and a lower continuously rotatable sprocket 7. The film 14 is advanced intermittently into and out of an aperture in a front plate 9 having a spring pressed back plate 10 by an intermittent mechanism of any standard type such as shown generally at 13. In a projector, the pressure plate 10 will also have an aperture therein. To permit this type of operation, an upper soft film loop 11 and a lower soft film loop 12 are provided. In the film path illustrated, the film 14 passes around a guide roller 15 between the intermittent mechanism 13 and the continuously driven sprocket 7. If the projector includes sound reproduction, the roller 15 may be a drum over which the film hangs for reproducing the sound track on the film, as is well known in the art.

The loop restoring mechanism includes a ratchet wheel 17 mounted on a shaft 18 of the sprocket 7, and is thus rotatable with the sprocket 7 by friction between the contacting end surfaces of the sprocket and wheel. Having one end loosely pivoted on the shaft 18, is an arm 20, the other end of the arm having a second arm 21 pivoted thereon at 22. The arm 21 has a roller 24 rotatably mounted thereon, while the end 25 of the arm 21 is formed as a pawl to contact the notches of the ratchet wheel 17. At the center of the arm 21, is a right angle extension 26 adapted to contact the lower edge of the arm 20 and limit the rotation of the arm 21 on the pivot 22 in one direction. A coil tension spring 28 has one end attached to the end of arm 21 adjacent the pawl end 25, and its other end anchored to the panel 5 at 29. The spring 28 normally holds the pawl end 25 of arm 21 out of the ratchet wheel notches and holds both arms 20 and 21 and the roller 24 against a stop pin 31 which contacts the upper edge of the arm 20. This normal position is as shown in Fig. 1.

The operation of the device as described so far will be explained in connection with Fig. 2. When the film loop decreases to the size shown by the solid lines in Fig. 2, it contacts the roller 24 and further tautness of the film or decrease in the loop size will raise the roller 24 in the direction shown by arrow 32 to the position shown by the broken lines of the roller in Fig. 2. The arm 21 thus pivots on pivot 22, overcoming the tension of the spring 28 and rotating the pawl end 25 in the direction shown by the arrow 33 into one of the notches of the ratchet wheel 17, which is rotating in the direction of the arrow 34. Upon contact of the pawl 25 with the wheel 17, the arms 20 and 21 and the roller 24 are rotated in the direction shown by the arrow 34, and the size of the loop will be increased by increasing the acceleration of the film past the intermittent mechanism 13.

When the arms reach the position shown by the lower broken lines, the corner 36 of the arm 21 contacts the upper portion of a tapered element 37 attached to the panel by screws 38. Upon this contact, the arm 21 is rotated on its pivot in the direction of the arrow 40, and the pawl end 25 of the arm 21 is thus gradually removed from its notch in the ratchet wheel 17. When the disconnection is complete, the spring 28 moves the arms and roller upwardly to the position shown in Fig. 1, where they are stopped by the pin 31.

The wedge shaped element 37 could be a flat stop, but the tapered element is preferred to prevent the sudden stopping of the arms. Although the arms are shown pivoted on the sprocket shaft 18, it is to be understood that the ratchet wheel 17 could be driven with another shaft at a different location from that shown, so long as the rotation of the ratchet wheel is in the right direction to increase the loop when the contact is made between the arms and the ratchet wheel. Thus, the invention is adaptable to different types of projectors or cameras, and when once installed or when originally built in to the apparatus, it will function thereafter without attention.

I claim:

1. A loop restoring mechanism for an intermittent film feed mechanism having at least one soft loop adapted to vary in size, comprising an intermittent film advancing unit, continuous film advancing means, a film guide roller between said unit and said means, a soft loop being formed between said intermittent unit and said roller, a first arm having one end loosely pivoted on the axis of said continuous film advancing means, said arm being normally stationary but rotatable in the direction of rotation of said continuous film advancing means, a second arm centrally pivoted on the other end of said first mentioned arm, said second arm being normally stationary but rotatable on its pivot in the opposite direction to the direction of rotation of said first arm, said second arm having a portion extending within the soft loop of said film, means for normally maintaining said portion within said loop out of contact with the film in said loop and said arms stationary, said maintaining means including a spring and a stop for said first arm and said second arm, a decrease in the size of said loop other than the normal decreases produced by said intermittent film advancing unit bringing said film into contact with said portion in said loop, means continuously rotatable with and driven by said continuous film advancing means, movement of the portion of said film in said loop after contact with said portion of said second arm within said loop rotating said second arm for connecting an end of said second arm to said rotatable means, said first arm being rotated thereby in the direction of rotation of said continuous film advancing means to move said second arm in the direction of rotation of said continuous film advancing means to increase the size of said loop, and fixed means contactable by said second arm to rotate said second arm in a direction opposite to its first direction of rotation to disconnect the end thereof from said rotatable means.

2. A loop restoring mechanism for an intermittent film feed mechanism in accordance with claim 1, in which said portion of said second arm within said film loop is a roller mounted on one end of said second arm.

3. A loop restoring mechanism for an intermittent film feed mechanism in accordance with claim 1, in which said portion of said second arm within said film loop is a roller mounted on one end of said second arm, said maintaining means being a spring having one end attached adjacent the other end of said second arm and its other end fixedly anchored.

4. A loop restoring mechanism for an intermittent film feed mechanism in accordance with claim 1, in which said portion of said second arm within said film loop is a roller mounted on one end of said arm, said spring having one end attached adjacent the other end of said second arm and its other end fixedly anchored, and said rotatable means being a ratchet wheel rotatable with and on the same axis as said continuous film advancing means.

5. A loop restoring mechanism for an intermittent film feed mechanism in accordance with claim 1, in which said portion of said second arm within said film loop is a roller mounted on one end of said second arm, said spring having one end attached adjacent the other end of said second arm and its other end fixedly anchored, said rotatable means being a ratchet wheel rotatable with and on the same axis as said continuous film advancing means, and said last mentioned fixed means being a tapered stop for gradually removing said end of said second arm from contact with said wheel.

6. A film loop restorer between an intermittent film advancing mechanism and a continuous film advancing sprocket comprising a film guide roller between said mechanism and said continuous film advancing sprocket, a soft loop being formed between said roller and said mechanism, a ratchet wheel on the axis of said sprocket and rotatable in the direction of and driven by said sprocket, an arm loosely pivoted on the axis of said wheel and normally stationary but adapted to be rotated in the direction of rotation of said wheel, a second arm centrally pivoted on the end of said first arm, a roller on one end of said second arm, said roller being moved in one direction by said film when said soft film loop decreases below a certain size, the movement of said roller rotating said second arm on said first arm and bringing the other end of said second arm into contact with said ratchet wheel, means attached to said other end of said second arm for normally holding said other end of said second arm out of contact with said wheel and said first arm stationary, said means permitting rotation of said second arm and contact between said other end of said second arm and said wheel when said film moves said roller, said ratchet wheel rotating said first arm to carry said second arm with it, and fixed means contacted by said second arm for rotating said second arm in the opposite direction to its first rotation for disconnecting said other end of said second arm from said ratchet wheel after rotation of said first arm and moving said second arm and said roller in the same direction as the direction of rotation of said wheel a predetermined distance by said wheel.

7. A film loop restorer in accordance with claim 6, in which said holding means is a spring and said last mentioned means is a wedge for gradually removing said other end of said second arm from said wheel.

WILLIAM E. CUNNINGHAM.

References Cited in the file of this patent

UNITED STATES PATENTS

| Number | Name | Date |
| --- | --- | --- |
| 2,418,361 | McNabb | Apr. 1, 1947 |
| 2,434,355 | Fairbanks | Jan. 13, 1948 |